United States Patent [19]

Fan

[11] Patent Number: 5,787,057
[45] Date of Patent: Jul. 28, 1998

[54] CD-ROM TESTING APPARATUS

[75] Inventor: Jackley Fan, Chung Li, Taiwan

[73] Assignee: Behavior Tech Computer Corp., Taipei, Taiwan

[21] Appl. No.: 863,380

[22] Filed: May 27, 1997

[51] Int. Cl.⁶ .................................................. G11B 7/00
[52] U.S. Cl. ........................... 369/34; 369/54; 369/58
[58] Field of Search .......................... 369/34, 53, 58, 369/54

[56] References Cited

U.S. PATENT DOCUMENTS

| | | | |
|---|---|---|---|
| 5,504,571 | 4/1996 | Eckerman et al. | 369/53 |
| 5,589,777 | 12/1996 | Davis et al. | 369/53 |
| 5,590,047 | 12/1996 | Uehara | 369/34 |

Primary Examiner—Tod R. Swann
Assistant Examiner—Kim-Kwok Chu
Attorney, Agent, or Firm—Rosenberg, Klein & Bilker

[57] ABSTRACT

A CD-ROM testing apparatus includes a frame on which a working table is supported. A CD-ROM tester is provided on the table, having a test system provided on one side of the tester for engage and actuate the control buttons and knobs of the CD-ROM and a pin card for engaging the back side slot of the CD-ROM provided on the opposite side. A CD-ROM transportation device is provided on the table for sequentially picking up one of a plurality of CD-ROMs carried on a cart and transporting the picked CD-ROM to the tester. A disk shifting device is provided to place a test disk into the CD-ROM located in the tester for test purpose. A personal computer and a programmable logic controller are provided to control the test operation of the testing apparatus and to store the test result.

20 Claims, 7 Drawing Sheets

CD-ROM TESTING APPARATUS

FIELD OF THE INVENTION

The present invention relates generally to a CD-ROM testing apparatus and in particular to an apparatus for automatically and sequentially performing an overall test on CD-ROMs.

DESCRIPTION OF THE INVENTION

With the increasing development of the personal computer systems, data storage device is also increasingly developed and advanced. Among the common data storage devices, CD-ROM is known to have large storage capacity and fast access speed. The prevailing of personal computers drives the need of CD-ROM to a significant level. Currently, the CD-ROMs are tested manually in a manufacturing factory. This prohibits the manufacturing efficiency from significantly improved. It is thus desirable to have a testing apparatus which is capable to automatically perform an overall test on a number of CD-ROMs in a sequential manner so as to increase the productivity thereof.

SUMMARY OF THE INVENTION

Therefore, an object of the present invention is to provide a CD-ROM testing apparatus which is operated under the control of a micro-processor based controller to perform an overall test on CD-ROMs in a sequential manner with the test result stored in the micro-processor base controller for further access and processing.

Another object of the present invention is to provide a CD-ROM testing apparatus which is operated in combination with a CD-ROM carrier cart carrying a plurality of CD-ROMs to be tested in order to perform an automatic test process on the CD-ROMs in a sequential manner for increasing efficiency and reducing labor needed in the CD-ROM testing operation.

A further object of the present invention is to provide a CD-ROM testing apparatus comprising a central processing device, such as a personal computer, to control the operation thereof and thus allow modifications of the testing sequence and provide flexibility in the testing process.

To achieve the above objects, in accordance with the present invention, there is provided a CD-ROM testing apparatus comprising a frame on which a working table is supported. A CD-ROM tester is provided on the table, having a test system provided on one side of the tester for engage and actuate the control buttons and knobs of the CD-ROM and a pin card for engaging the back side slot of the CD-ROM provided on the opposite side. A CD-ROM transportation device is provided on the table for sequentially picking up one of a plurality of CD-ROMs carried on a cart and transporting the picked CD-ROM to the tester. A disk shifting device is provided to place a test disk into the CD-ROM located in the tester for test purpose. A personal computer and a programmable logic controller are provided to control the test operation of the testing apparatus and to store the test result.

The objects, features and advantages of the present invention will be readily understood from the following description of a preferred embodiment thereof with reference to the accompanying drawings, wherein:

DETAILED DESCRIPTION OF THE PREFERRED EMBODIMENT

Figure 1:
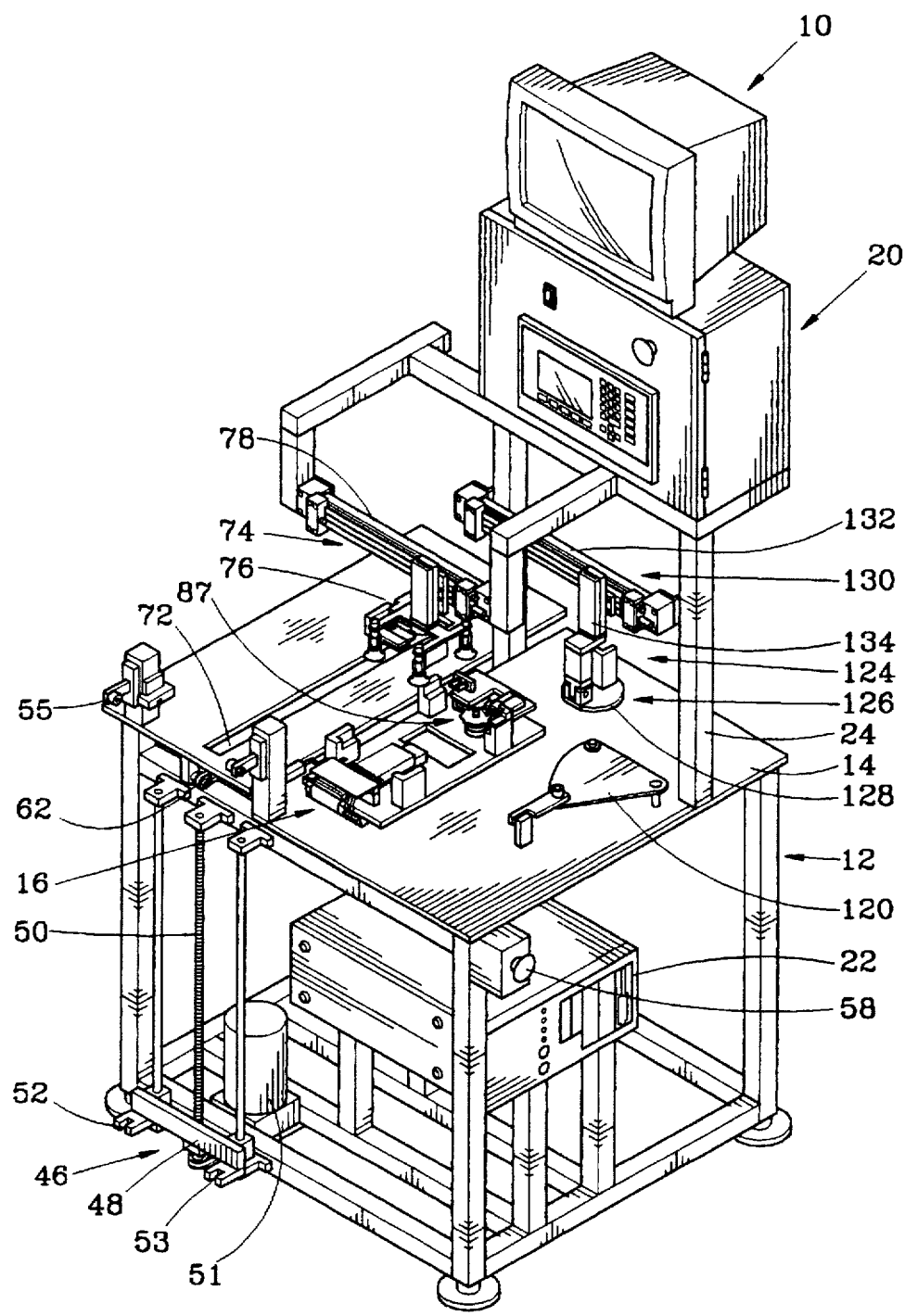
FIG. 1 is a perspective view showing a CD-ROM testing apparatus constructed in accordance with the present invention.
Figure 2:
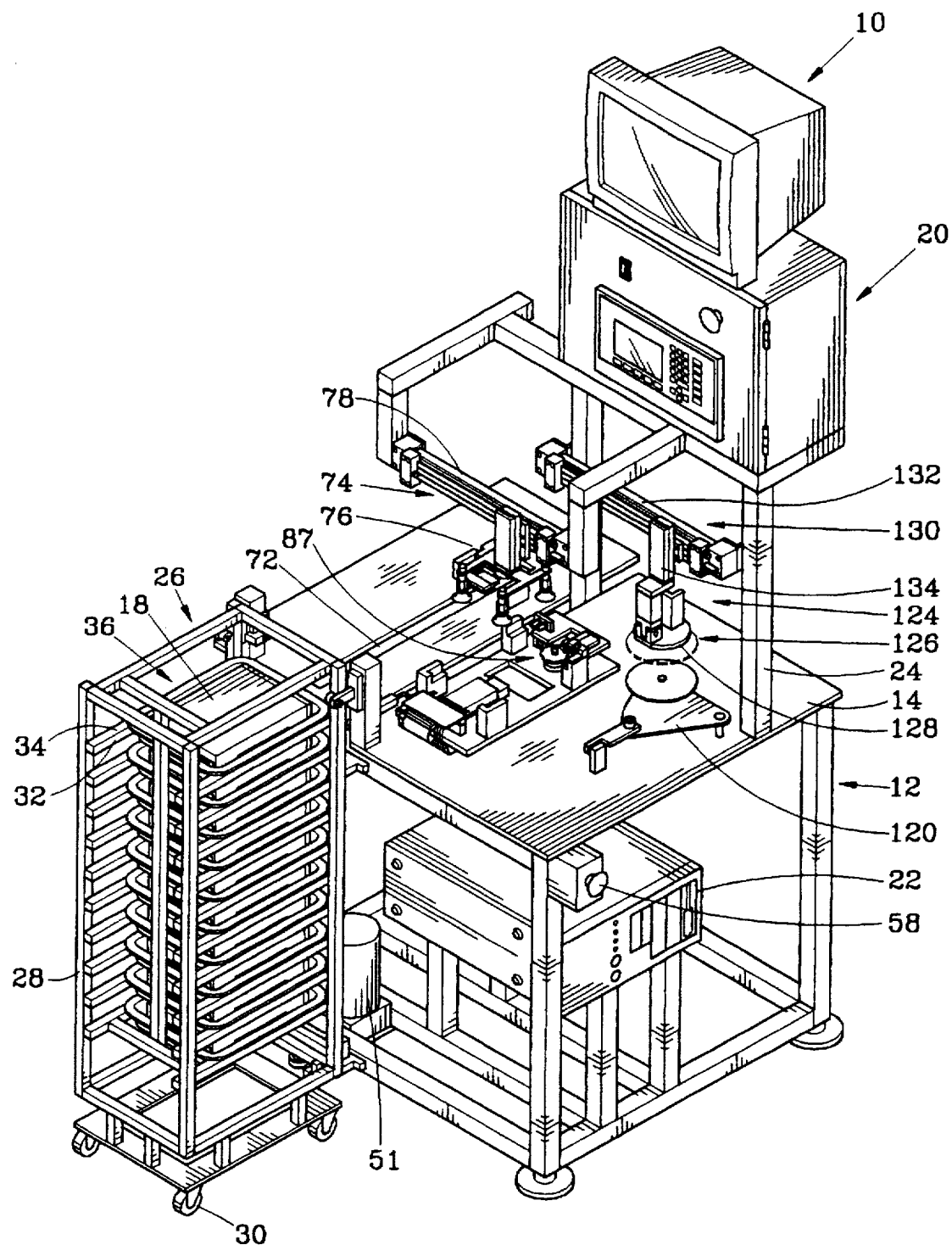
FIG. 2 is a perspective view of the CD-ROM testing apparatus of the present invention and a CD-ROM cart in which CD-ROMs to be tested are carried.

With reference to the drawings and in particular to FIGS. 1 and 2, wherein a CD-ROM testing apparatus constructed in accordance with the present invention, generally designated with reference numeral 10, is shown, the CD-ROM testing apparatus in accordance with the present invention comprises a frame 12 on which a working table 14 is provided. A CD-ROM tester 16 is provided on the table 14 for receiving and holding therein a CD-ROM to be tested, designated at 18 (see FIGS. 4 and 5), in order to perform test on the CD-ROM 18. The test process that is performed on the CD-ROM testing apparatus 10 is controlled by a programmable logic controller (PLC) 20 which may be in communication with a personal computer 20 via RS232 device to record the test result and perform control on other operation routines.

In a preferred embodiment of the present invention, the PLC 20 is mounted on the frame 12 at a location above the table 14 and supported by two spaced upright rods 24. The personal computer 22 is placed under the table 14 and fixed to the frame by any suitable means.

Figure 3:
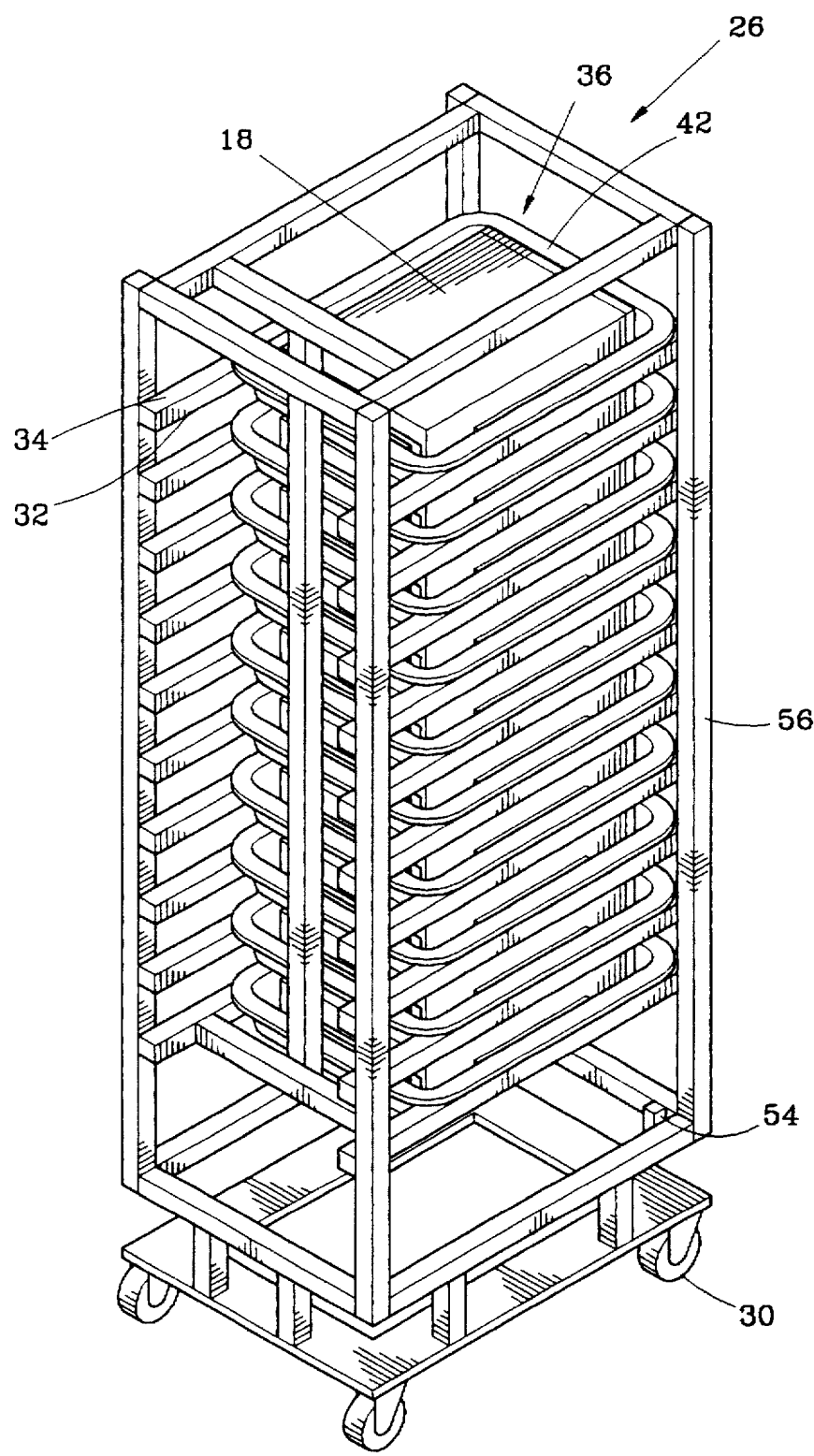
FIG. 3 is an enlarged perspective view showing the CD-ROM carrier cart.

The CD-ROM testing apparatus 10 of the present invention further comprises a CD-ROM carrier cart 26, see FIGS. 2 and 3. The cart 26 comprises a chassis 28 preferably having casters 30 mounted on the under side thereof for ready movement. The chassis 28 has a plurality of tray holders 32 spaced from each other at a suitable distance in a vertical direction, each being formed by two horizontally spaced rail bars 34 extending in a horizontal direction for supporting thereon a CD-ROM tray 36 at two opposite side edges of the tray 36. Each of the trays 36 may have a CD-ROM to be tested 18 placed therein so that the cart 26 may carry a plurality of CD-ROMs 18.

Figure 4:
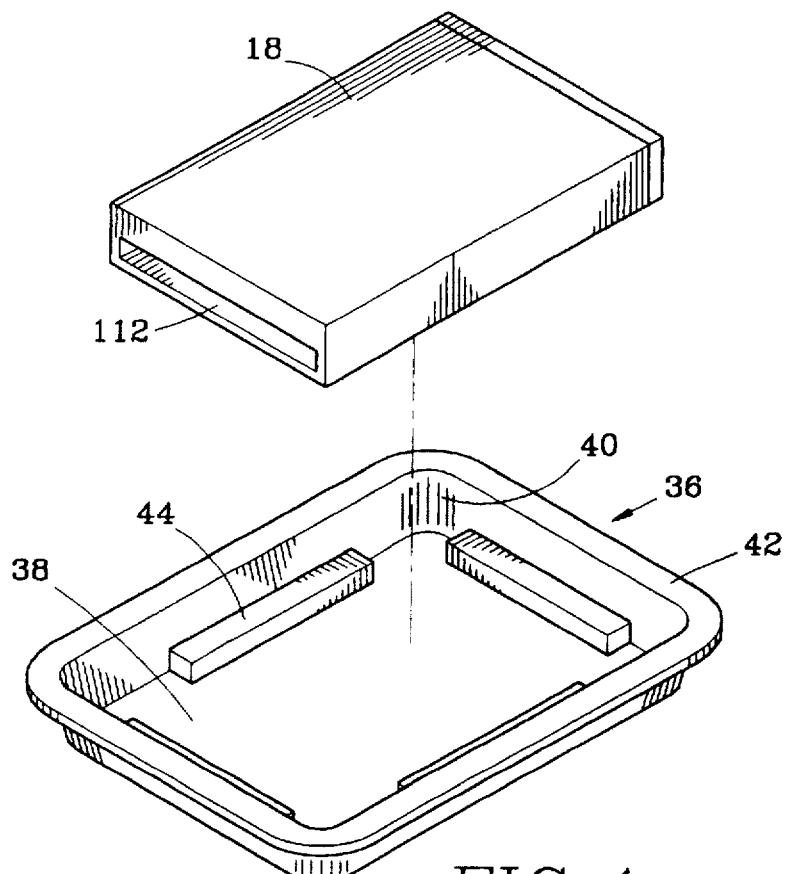
FIG. 4 is a perspective view showing a CD-ROM tray, together with a regular CD-ROM that is available in the market.

The construction of the CD-ROM tray 36 is particularly shown in FIG. 4. As shown, the tray 36 comprises a shallow pan configuration, having a bottom 38 with a circumferential side wall 40 surrounding the bottom 38. The side wall 40 has a rim 42 extending outward in a horizontal direction to be supported by the rail bars 34 of the tray holder 32 of the cart 26 in a slidable manner. The tray 36 may further comprise a plurality of pads 44 disposed therein to support the CD-ROM 18 at a predetermined level and location in order to be properly handled by the CD-ROM testing apparatus 10.

The CD-ROM testing apparatus 10 comprises an elevator device 46 mounted on the frame 12, see FIG. 1, which comprises a cart support member 48 in threading engagement with an upright screw rod 50 so that when the screw rod 50 is rotated, the cart support member 48 moves up and down along the screw rod 50. In accordance with the present invention, the screw rod 50 is driven by a motor 51 via a suitable transmission. The cart support member 48 has two spaced engaging members 52 for engaging the cart 26 so as to move the cart 26 with the cart support member 48 when the cart support member 48 is driven by the motor 51 to move up and down along the screw rod 50. Preferably, each of the engaging members 52 has a forked end 53 to be fit over a bar member 54 (see FIG. 3) provided at suitable location on the cart 26. Further, the frame 12 has two guide rollers 55 mounted on the table 14 to be respectively rollingly engaged by two upright guide rods 56 provided on the cart 26 for the guiding the up and down moment thereof along the screw rod 50 and also holding the cart 26 on the support member 48.

The motor 51 is controlled by the PLC 20 to move the cart 26 that is supported on the support member 48 in the vertical direction a desired distance via the screw rod 50. In general, the traveling distance of each movement of the cart 26 along the screw rod 50 is preferably equal to the spacing distance between two successive tray holders 32 of the cart 26 so that each time the PLC 20 moves the cart 26 through such a distance, the next one of the CD-ROMs 18 that are carried by the cart 26 may be advanced to a position ready to be further handled. In this way, the CD-ROMs 18 that are carried by the cart 26 may be handled sequentially. Although the traveling distance of the movement of the cart 26 along the screw rod 50 each time when the screw rod 50 is driven by the motor 51 is preferred the distance between two successive trays 36 carried by the cart 26, yet there is no actual limit to the traveling distance which may be two or even more times of the distance between two tray holders 32 of the cart 26 so that each time the cart 26 is advanced, one of the CD-ROMs 18 carried by the cart 26 may be placed at the ready-to-handle position relative to the table 14.

Moreover, in accordance with the present invention, a one touch upward movement switch 58 is provided to be in electrical and mechanical connection with the motor 51 and the PLC 20 for immediately moving the cart 26 directly to the highest portion relative to the table 14 and the cart 26 may then be gradually lowered down by the motor 51 via the screw rod 50. In this way, the CD-ROMs 18 that are carried by the cart 26 may be sequentially tested in a reversed order. The operator of the CD-ROM testing apparatus 10 may thus be able to select to test the CD-ROMs in a forward order or in a reversed order.

Figure 6:
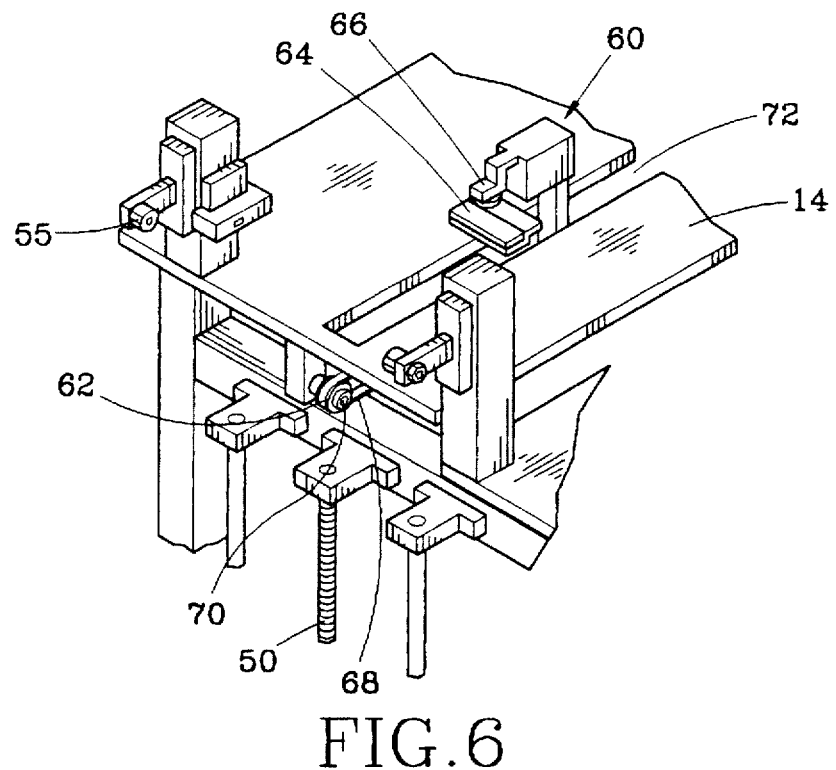
FIG. 6 is a perspective view of a portion of the CD-ROM test apparatus of the present invention showing the tray gripping device.

The CD-ROM testing apparatus 10 comprises a tray gripping device 60 (also see FIG. 6) for sequentially gripping and moving the CD-ROM trays 36 out of the cart 26 under the control of the PLC 20. The tray gripping device 60 is mounted on conveyor means 62 to allow the tray 36 that is gripped and held by the tray gripping device 60 to be moved from the cart 26 to a CD-ROM grasping position on the table 14.

Figure 7:
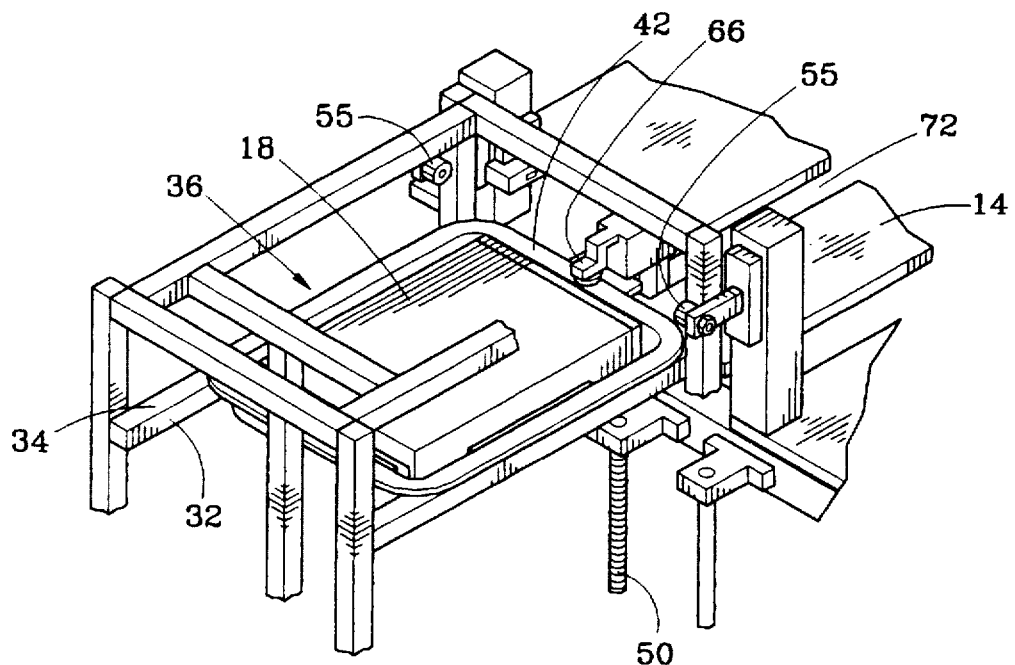
FIG. 7 is a perspective view similar to FIG. 6, but showing a CD-ROM tray gripped by the tray gripping device.

In the embodiment illustrated, the tray gripping device 60 comprises a fixed jaw member 64 and movable jaw member 66 positioned opposite to the fixed jaw member 64. The movable jaw member 66 is driven by a power device, such as pneumatic cylinder (not shown), to be movable relative to the fixed jaw member 64 between an open position and a closed position. At the open position, a gap is formed between the two jaw members 64 and 66 which is large enough to receive the rim 42 of the tray 36 therein. When the movable jaw member 66 is driven toward the closed position, it pinches and thus grips the rim 42 of the tray 36 between the two jaw members 64 and 66, see FIG. 7.

In the embodiment illustrated, the conveyor means 62 of the tray gripping device 60 comprises a transmission, such as a timing belt 68, to which the tray gripping device 60 is fixed and movable therewith. The timing belt 68 is driven by for example a motor (not shown) to move around pulleys 70. As shown and preferably, the timing belt 68 is located under the table 14 and the table 14 is provided with an elongated slot 72 through which the tray gripping device 60 extends to the upper side of the table 14 to have the two jaw members 64 and 66 located above the table 14. The cart 26 is moved by the motor 51 via the screw rod 50 in such a manner to have one of the trays 36 carried by the cart 26 located at a position to have the rim 42 of the tray 36 received between and gripped by the fixed and movable jaw members 64 and 66 when the tray gripping device 60 is moved by the conveyor means 62 to the tray gripping position.

When the rim 42 of the tray 36 is gripped and held by the tray gripping device 60, the timing belt 68 is driven to carry the tray 36 out of the cart 26 to the table 14. Preferably, the size and configuration of the tray 36 and the relative position of the tray gripping device 60 above the table 12 are such that when the tray 36 is moved by the tray gripping device 60 from the cart 26 to the table 14, the bottom 38 of the tray 36 is substantially resting on the table 14 so that when the tray gripping device 60 is moved with the timing belt 68, the tray 36 slides over the table 14 toward a CD-ROM grasping position inside the table 14 for further handling and processing.

Back to FIGS. 1 and 2, the CD-ROM testing apparatus 10 further comprises a CD-ROM transportation device 74 on the table 14. The CD-ROM transportation device 74 comprises a CD-ROM grasping device 76 for grasping the CD-ROM 18 out of the tray 36 that is located at the CD-ROM grasping position on the table 14. The CD-ROM transportation device 74 also comprises a CD-ROM moving device 78, on which the CD-ROM grasping device 76 is mounted, for moving the CD-ROM grasping device 76, together with the CD-ROM 18 grasped and held thereby from the CD-ROM grasping position toward the tester 16.

Figure 8:
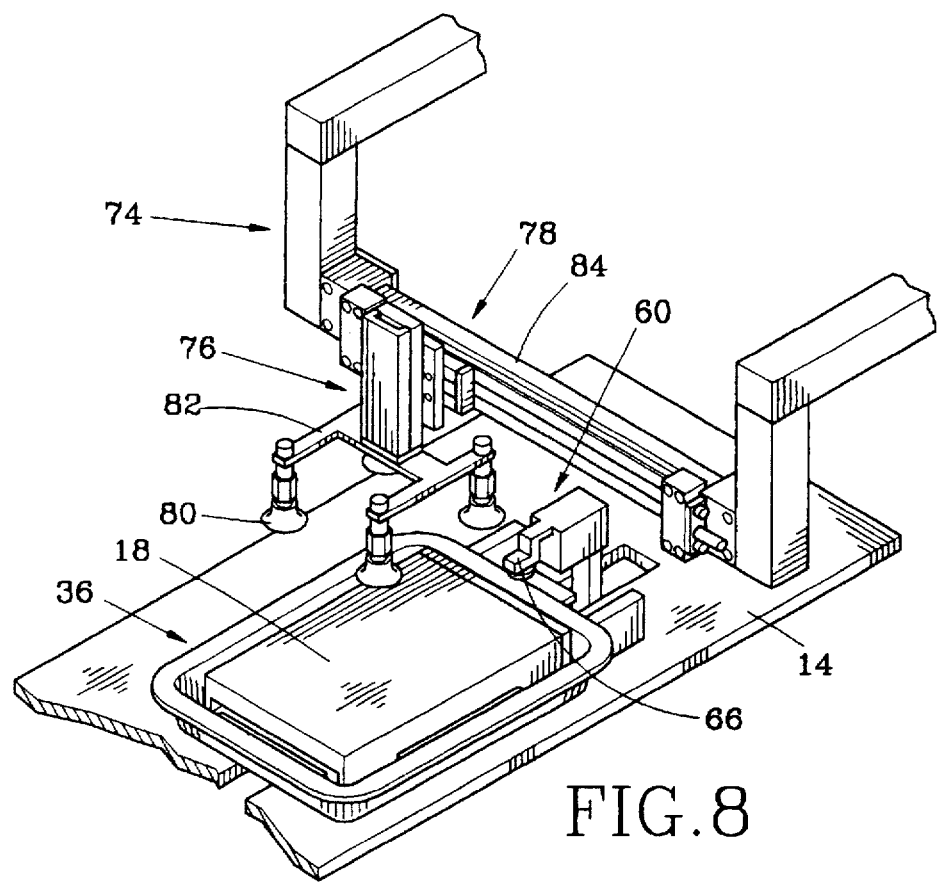
FIG. 8 is a perspective view of a portion of the CD-ROM testing apparatus, showing the CD-ROM transporting device, together with a CD-ROM ready to be transported thereby.

Also referring to FIG. 8, the CD-ROM grasping device 76 comprises a plurality of vacuum suction cups 80 configured to engage, in a sealing manner, an upper surface of the CD-ROM 18 received within a CD-ROM tray 36 that is located at the CD-ROM grasping position. The suction cups 80 are connected to a vacuum source (not shown) via hoses (not shown) so as to generate vacuum suction therein under the control of the PLC 20 for grasping the CD-ROM 18. In accordance with a preferred embodiment of the present invention, the suction cups 80 are fixed on a carrier board 82 which is movable by being driven by a power device, such as a pneumatic cylinder (not shown) to have the suction cups 80 engage with/disengage from the CD-ROM 18.

The CD-ROM moving device 78 of the CD-ROM transportation device 74 further comprises a horizontally extending rail 84 with suitable transmission means, such as screw rod or belt, mounted thereon for moving the CD-ROM grasping device 76 along the rail 84. The rail 84 has a length that is sufficient to allow the CD-ROM grasping device 76 to move between the CD-ROM grasping position and the tester 16 so as to convey the CD-ROM 18 from the tray 36 at the CD-ROM grasping position to the tester 16.

Figure 5:
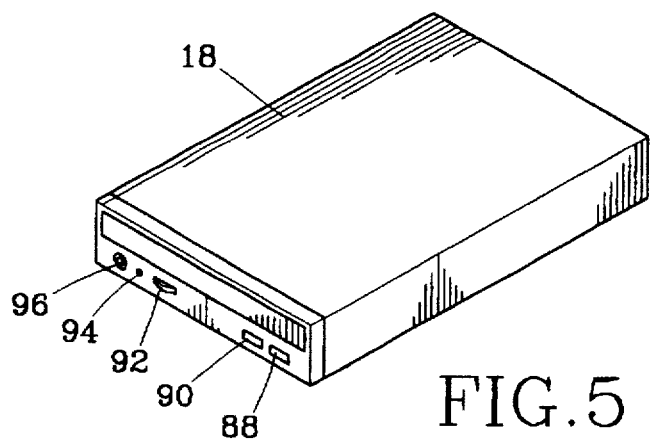
FIG. 5 is a perspective view showing the CD-ROM in a front side.
Figure 9:
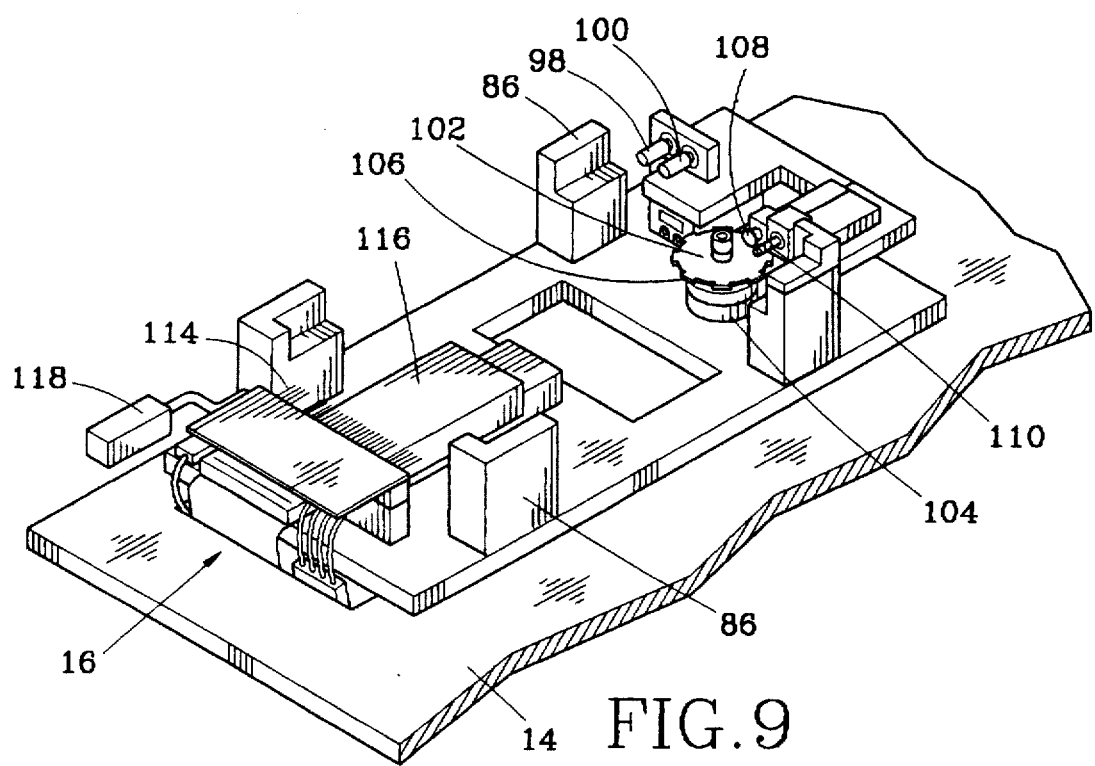
FIG. 9 is a perspective view of a portion of the CD-ROM testing apparatus, showing the tester.
Figure 11:
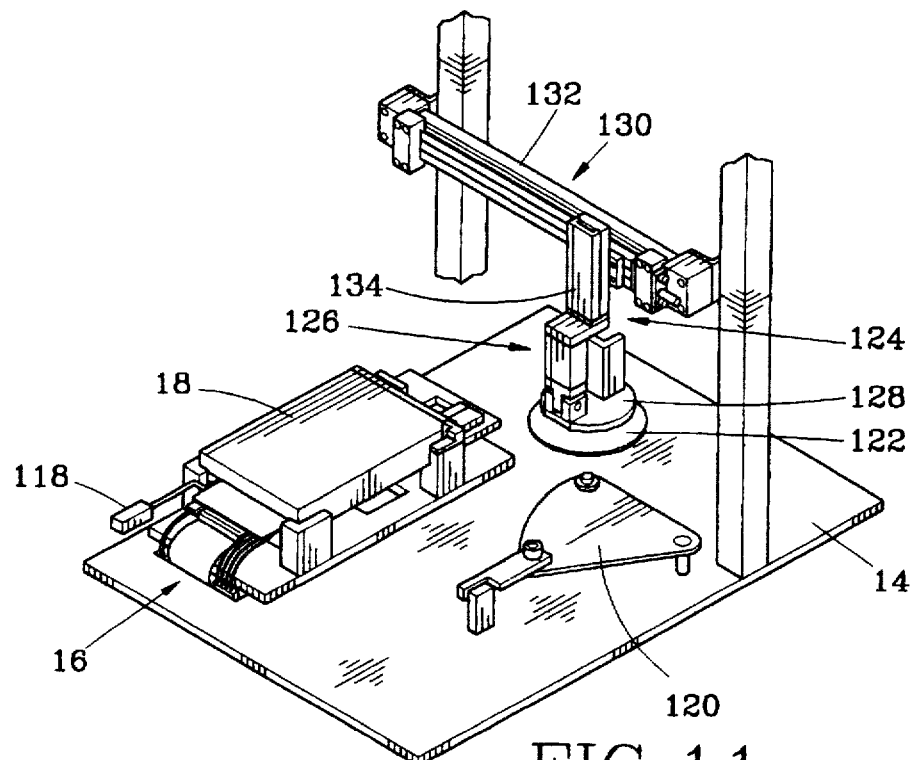
FIG. 11 is a perspective view similar to FIG. 10 but having a CD-ROM placed in the tester for test.

With reference to FIG. 9, which shows the CD-ROM tester 16, the tester 16 comprises a plurality of support rods 86 to support and hold the CD-ROM to be tested thereon, see FIG. 11. The tester 16 comprises a test actuation system 87 provided at a front side of the tester 16 which comprises means for actuating control buttons/knobs and signal output elements that are provided on the front panel of the CD-ROM 18. As shown in FIG. 5, in general, the CD-ROM 18 comprises a stop/eject button 88, a play/fast forward button 90, a volume control knob 92, an operation indicator 94 which is in general a light emitting diode and an ear phone jack 96 provided on the front panel thereof. In respect of theses buttons/knob/jack, the test actuation system 87 comprises a first pushing member 98 and a second pushing member 100 respectively corresponding in position to the stop/eject button 88 and the play/fast forward button 90. The first and second pushing members 98 and 100 are driven by power devices, such as pneumatic cylinders, to have them movable toward/away from the stop/eject button 88 and play/fast forward button 90 of the CD-ROM 18 so as to trigger the stop/eject button 88 and the play/fast forward button 90 when they are moved toward the CD-ROM 18 to be tested for testing the operability of these buttons 88 and 90.

The test actuation system 87 of the CD-ROM tester 16 also comprises a volume control knob actuating disk 102 which is located in position corresponding to the volume control knob 92 of the CD-ROM 18 and is driven by suitable means, such as a motor 104, to rotate about a central axis thereof. The motor 104 is controlled by the PLC 20. The disk 102 comprises a plurality of teeth 106 radially projecting out of the disk circumference and spaced from each along the circumference which teeth 106 engage and drive the volume control knob 92 of the CD-ROM 18 during the rotation of the disk 102 for testing the operability of the volume control knob 92 of the CD-ROM 18.

The test actuation system 87 of the CD-ROM tester 16 further comprises a photo detector 108 which is positioned corresponding to the operation indicator 94 of the CD-ROM 18 so that when the indicator 94 which is in general a light emitting diode emits light, the photo detector 108 detects the light and confirms the proper operation of the indicator 94. A plug 110 is also provided in the test actuation system 87 for engaging the ear phone jack 96 of the CD-ROM 18 by being driven by a power device, such as pneumatic cylinder (not shown) to move relative to the CD-ROM 18. Signals that are received from the photo detector 108 and the plug 110 are then sent to the PLC 20 to determine if the associated functions of the CD-ROM 18 work properly.

As shown in FIG. 4, the CD-ROM 18 generally comprises a slot 112 on the back side (the side that is opposite to the front panel), having a plurality of contact terminals (not shown) therein for transmission of data, power and control signals. In accordance with the present invention, the tester 16 is provided with a pin card 114 constituted by a plurality of pins on the opposite side of the actuation system 87. The pin card 114 is configured to be fit into the slot 112 to establish electrical connection therewith and is mounted on movable carrier 116 which is driven by a power device, such as pneumatic cylinder 118 to move relative to the slot 112 of the CD-ROM 18 so as to plug the pin card 114 into the slot 112 or to withdraw the pin card 114 out of the slot 112.

Figure 10:
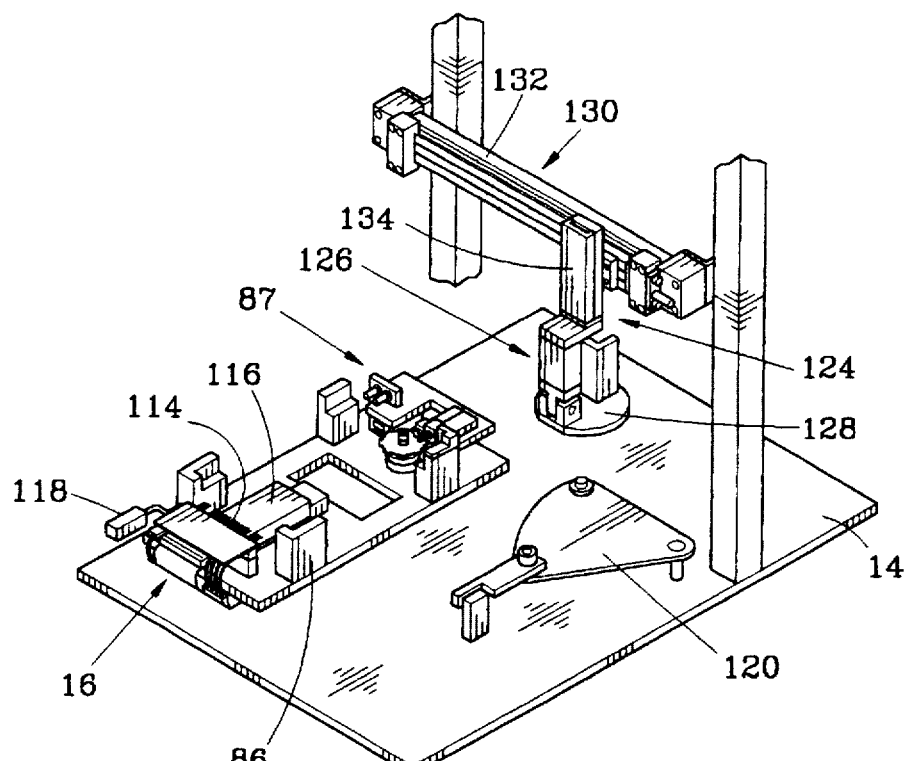
FIG. 10 is a perspective view of a portion of the CD-ROM testing apparatus, showing the tester and a disk shifting device.

Referring to FIGS. 1 and 2 again, the CD-ROM testing apparatus 10 further comprises a disk support 120 on the table 14 for supporting thereon a test optic disk 122. A disk shifting device 124 is also provided on the table 14 for moving the disk 122, comprising a disk pick up device 126 comprising a vacuum suction cup 128 in fluid communication with a vacuum source (not shown) and carried and moved by a transporting device 130. The transporting device 130 comprises a horizontally extending rail 132 on which a slide 134 is movably mounted to be driven by a power device (not shown) to move along the rail 132. The disk pick up device 126 is fixed on the slide 134 and is movable relative to the rail 132 in a vertical direction by being driven by a power device, such as pneumatic cylinder (not shown) so that by being controlled by the PLC 20, the suction cup 128 may be moved to engage the disk 122 and pick up the disk 122 by means of the vacuum suction created therebetwen, as shown by phantom line in FIG. 2. FIGS. 10 and 11 particularly show the disk support 120 and the disk shifting device 124.

With reference to FIG. 11, having been picked up by the vacuum suction cup 128, the disk 122 may be moved by the disk transporting device 130 under the control of the PLC 20 to the tester 16 and then positioned into the CD-ROM 18 by opening the CD-ROM 18 with the contact engagement between the first pushing member 98 of the test actuation system 87 of the tester 16 and the stop/eject button 88 of the CD-ROM 18. Under such a situation, the PLC 20 may power the CD-ROM 18 by means of the engagement between the pin card 114 and the slot 112 of the CD-ROM 18 and operates the CD-ROM 18 by means of the engagement between the second pushing member 100 and the play/fast forward button 90 of the CD-ROM 18. The test of the CD-ROM 18 is also conducted through the photo detector 108 and the plug 110 for the operation indicator 94 and ear phone jack 96. The volume control knob actuating disk 102 may also be controlled by the PLC 20 to rotate the volume control knob 92 of the CD-ROM 18 for test of the function thereof.

Due to the incorporation of the personal computer 22 and the PLC 20 in the CD-ROM testing apparatus 10 of the present invention, the operator may modify the test process as wishes. In accordance with the present invention, an exemplary testing process may be manually loading CD-ROMs to be tested into the trays 36 located inside the cart 26 and then placing the cart 26 on the cart support member 48 of the elevator device 46. The PLC 20 may then be started to control the motor 51 to drive the screw rod 50 for moving cart 26 relative to the table 14 and positioning a first one of the CD-ROMs to be tested at the tray gripping position to allow the tray 36 that contains the CD-ROM 18 therein to be gripped and picked up by the tray gripping device 60. The tray 36, together with the CD-ROM 18 therein, is then moved to the CD-ROM grasping position by the conveyor means 62. The PLC 20 may then use the CD-ROM transportation device 74 to pick up and transport the CD-ROM 18 to the tester 16. The CD-ROM 18 is opened and the test optic disk 122 is positioned therein and in the mean time, the pin card 114 is driven by the pneumatic cylinder 118 to engage the slot 112 of the CD-ROM 18. The test actuation system 87 of the tester 16 is then activated to carry out desired test on the CD-ROM 18. All the test result is then forwarded and stored in the computer 22 by means of the PLC 20.

After the test is completed, the disk 122 is retrieved out of the CD-ROM 18 and positioned back to the support 120 and the pin card 114 is disengaged from the slot 112 by being driven by the pneumatic cylinder 118. Thereafter, the CD-ROM 18 is moved back to the tray 36 and the tray 36 and the CD-ROM 18 are conveyed back to the cart 26. This completes the test of one of the CD-ROMs 18. The cart 26 may then be advanced to have the next CD-ROM ready to test. The test cycle of the CD-ROM may be repeated until all the CD-ROMs have been tested. Then the cart 26 is removed from the elevator device 46 to allow a next cart to be positioned thereon.

In accordance with the present invention, a plurality of CD-ROMs may be collectively carried by the cart 26 and then tested individually and sequentially. The test result is stored in the personal computer. This allows a significant reduction of labor as compared with the conventional way of testing the CD-ROM in a substantially fully manual manner and the testing efficiency is considerably increased.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A CD-ROM testing apparatus adapted to test a CD-ROM having a plurality of control switches and signal output elements and a control/power/data slot, the CD-ROM testing apparatus comprises:

a frame;

a CD-ROM transportation means mounted on the frame for picking up and moving the CD-ROM from an entry position to a testing position;

a CD-ROM tester, mounted on the frame at the testing position for receiving and performing test on the CD-ROM positioned at the testing position, the tester comprising a pin card engageable with the control/power/data slot of the CD-ROM to establish control/power/data connection therewith, the tester further comprising a test actuation system for testing the control switches and receiving signal from the signal output elements of the CD-ROM;

a disk shifting device for positioning a test disk into the CD-ROM located at the testing position; and a controller controlling the CD-ROM transportation means and the disk shifting device to position the CD-ROM into the tester and position the disk into the CD-ROM, the controller being electrically connected to the tester to operate the tester in testing the CD-ROM and receive and store test result.

2. The CD-ROM testing apparatus as claimed in claim 1, wherein the CD-ROM transportation means comprises a CD-ROM moving device comprising a horizontally extending rail having a transmission thereon with a CD-ROM grasping device for grasping the CD-ROM mounted thereon to be movable therewith between the entry position and the testing position.

3. The CD-ROM testing apparatus as claimed in claim 2, wherein the CD-ROM grasping device comprises a plurality of vacuum suction cups mounted on a carrier board which is movable vertically relative to the rail to have the cups engage with the CD-ROM, the vacuum suction cups being in fluid communication with a vacuum source to create a vacuum suction between the cups and the CD-ROM for grasping the CD-ROM.

4. The CD-ROM testing apparatus as claimed in claim 1, wherein the frame comprises a disk support for supporting the test disk theron and wherein the disk shifting device comprises a disk transporting device having a horizontally extending rail on which a disk pick up device is movably mounted to pick up the disk for moving the disk along the rail from the disk support to the testing position to place the test disk into the CD-ROM.

5. The CD-ROM testing apparatus as claimed in claim 4, wherein the disk pick up device comprises a vacuum suction cup mounted on a member which is movable relative to the rail to move the suction cup to engage the disk, the suction cup being in fluid communication with a vacuum source so as to create a vacuum suction between the suction cup and the disk to pick up the disk.

6. The CD-ROM testing apparatus as claimed in claim 1, wherein the controller comprises a central processing unit based controlling device.

7. The CD-ROM testing apparatus as claimed in claim 6, wherein the controller comprises a programmable logic controller in connection with a personal computer.

8. The CD-ROM testing apparatus as claimed in claim 1, wherein the test actuation system comprises a first pushing member and a second pushing member movable under the control of the controller to engage with/disengage from a first pushbutton and a second pushbutton of the control switches of the CD-ROM for testing the first and second pushbuttons.

9. The CD-ROM testing apparatus as claimed in claim 8, wherein the test actuation system further comprises a disk rotatable about a central axis under the control of the controller to engage and drive a volume control knob of the switches of the CD-ROM, the disk comprising a plurality of radially extending teeth spaced from each other for rotating the volume control knob.

10. The CD-ROM testing apparatus as claimed in claim 9, wherein the test actuation system further comprises a photo detector for detecting light generated by an indicator lamp of the signal output elements of the CD-ROM.

11. The CD-ROM testing apparatus as claimed in claim 10, wherein the test actuation system further comprises a plug movable to insert into an ear phone jack of the signal output elements of the CD-ROM.

12. The CD-ROM testing apparatus as claimed in claim 1, wherein the pin card of the tester is driven by a pneumatic power device to be movable relative to the CD-ROM received within the tester for engaging with/disengaging from the slot of the CD-ROM.

13. The CD-ROM testing apparatus as claimed in claim 1, further comprising a CD-ROM carrier cart having at least one holder for supporting thereon a CD-ROM to be tested and wherein the apparatus further comprises an elevator device for releasably supporting the cart thereon and moving the cart relative to the frame to sequentially position each of the at least one CD-ROM at a CD-ROM forwarding position to be moved by the CD-ROM transportation means to the tester.

14. The CD-ROM testing apparatus as claimed in claim 13, wherein the elevator device comprises a screw rod driven by a motor controlled by the controller and a cart support member in threading engagement with the screw rod for releasably supporting the cart thereon so that when the screw rod is driven to rotate, the cart support member moves along the screw rod to move the cart from an initial position to a final position by ways of at least one intermediate position corresponding to the CD-ROM forwarding position.

15. The CD-ROM testing apparatus as claimed in claim 14, wherein the frame comprises a plurality of guide rollers for rolling engagement with guide rods provided on the cast for guiding the movement of the cart from the initial position to the final position.

16. The CD-ROM testing apparatus as claimed in claim 14, wherein the elevator device further comprises a lifting control switch which allows the motor to drive the screw rod in such a manner to directly move the cart supported thereon from the initial position to the final position.

17. The CD-ROM testing apparatus as claimed in claim 13, wherein the cart comprises a tray supported on each of the at least one holder for receiving and holding the CD-ROM therein and wherein the apparatus further comprises a tray gripping device for sequentially picking up the tray from the cart, the tray gripping device being mounted on conveyor means for moving the tray picked up by the tray gripping device from the cart to the entry position.

18. The CD-ROM testing apparatus as claimed in claim 17, wherein the tray gripping device comprises a belt with the tray gripping device mounted thereon, which belt is moved between the elevator device and the entry position to allow the tray gripping device to pick up the tray.

19. The CD-ROM testing apparatus as claimed in claim 17, wherein the tray comprises an outward extending rim and wherein the tray gripping device comprises a fixed jaw and a movable jaw movable relative to the fixed jaw between an open position where a gap large enough to receive the tray rim therein is formed and a closed position where the movable jaw holds the tray rim on the fixed jaw.

20. The CD-ROM testing apparatus as claimed in claim 13, wherein the CD-ROM carrier cart comprises a plurality of casters mounted on under side thereof.

* * * * *